US012432518B2

(12) United States Patent
Falk et al.

(10) Patent No.: US 12,432,518 B2
(45) **Date of Patent: *Sep. 30, 2025**

(54) EFFICIENT SPATIALLY-HETEROGENEOUS AUDIO ELEMENTS FOR VIRTUAL REALITY

(71) Applicant: Telefonaktiebolaget LM Ericsson (publ), Stockholm (SE)

(72) Inventors: Tommy Falk, Spånga (SE); Werner De Bruijn, Stockholm (SE); Erlendur Karlsson, Uppsala (SE); Tomas Jansson Toftgård, Uppsala (SE); Mengqiu Zhang, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/634,358

(22) Filed: Apr. 12, 2024

(65) Prior Publication Data

US 2024/0349004 A1 Oct. 17, 2024

Related U.S. Application Data

(63) Continuation of application No. 17/421,269, filed as application No. PCT/EP2019/086877 on Dec. 20, 2019, now Pat. No. 11,968,520.

(Continued)

(51) Int. Cl.
*H04R 5/02* (2006.01)
*H04S 7/00* (2006.01)

(52) U.S. Cl.
CPC ........... *H04S 7/304* (2013.01); *H04S 2400/11* (2013.01); *H04S 2400/15* (2013.01); *H04S 2420/01* (2013.01); *H04S 2420/11* (2013.01)

(58) Field of Classification Search
CPC .. H04S 7/304; H04S 2400/11; H04S 2400/15; H04S 2420/01; H04S 2420/11

(Continued)

(56) References Cited

U.S. PATENT DOCUMENTS

2015/0382127 A1 12/2015 Sun et al.
2017/0251323 A1 8/2017 Jo et al.

(Continued)

FOREIGN PATENT DOCUMENTS

CN 104010265 8/2014
CN 106797525 5/2017

(Continued)

OTHER PUBLICATIONS

International Search Report and Written Opinion issued in International Application No. PCT/EP2019/086877 dated May 4, 2020 (13 pages).

(Continued)

*Primary Examiner* — Ammar T Hamid
(74) *Attorney, Agent, or Firm* — Rothwell, Figg, Ernst & Manbeck, P.C.

(57) ABSTRACT

In one aspect, there is a method for rendering a spatially-heterogeneous audio element. In some embodiments, the method includes obtaining two or more audio signals representing the spatially-heterogeneous audio element, wherein a combination of the audio signals provides a spatial image of the spatially-heterogeneous audio element. The method also includes obtaining metadata associated with the spatially-heterogeneous audio element, the metadata comprising spatial extent information indicating a spatial extent of the audio element. The method further includes rendering the audio element using: i) the spatial extent (Continued)

information and ii) location information indicating a position (e.g. virtual position) and/or an orientation of the user relative to the audio element.

19 Claims, 12 Drawing Sheets

Related U.S. Application Data

(60) Provisional application No. 62/789,617, filed on Jan. 8, 2019.

(58) Field of Classification Search
USPC .................................................. 381/310, 309
See application file for complete search history.

(56) References Cited

U.S. PATENT DOCUMENTS

| | | | |
|---|---|---|---|
| 2018/0068664 | A1 | 3/2018 | Seo |
| 2018/0091920 | A1 | 3/2018 | Family |
| 2018/0109901 | A1 | 4/2018 | Laaksonen |
| 2018/0359294 | A1 | 12/2018 | Brown et al. |

FOREIGN PATENT DOCUMENTS

| | | | | |
|---|---|---|---|---|
| WO | 2015/017235 | 2/2015 | | |
| WO | 2017/110882 | 6/2017 | | |
| WO | 2018/150774 | 8/2018 | | |
| WO | 2018/197748 | 11/2018 | | |
| WO | WO-2018197748 A1 * | 11/2018 | .............. | H04S 5/00 |

OTHER PUBLICATIONS

ISO/IEC 23008-3:201x(E), "Information technology—High efficiency coding and media delivery in heterogeneous environments—Part 3: 3D audio", ISO/IEC JTC 1/SC 29, Oct. 12, 2016 (23 pages).
Ebu Operating Eurovision and Euroradio Tech 3388, "ADM Renderer for Use in Next Generation Audio Broadcasting", Source: BTF Renderer Group, Specification Version 1.0, Geneva, Mar. 2018 (57 pages).
Carl Schissler et al., "Efficient HRTF-based Spatial Audio for Area and Volumetric Sources", IEEE Transactions on Visualization and Computer Graphics, vol. 22, No. 4, Apr. 2016 (pp. 1356-1366).
Audio subgroup, "Draft MPEG-I Audio Requirements", ISO/IEC JTC1/SC29/WG11, Coding of Moving Pictures and Audio, Macau, CN, Oct. 2018 (pp. 1-6).

* cited by examiner

EFFICIENT SPATIALLY-HETEROGENEOUS AUDIO ELEMENTS FOR VIRTUAL REALITY

CROSS-REFERENCE TO RELATED APPLICATIONS

This application is a continuation of Ser. No. 17/421,269, filed on 2021 Jul. 7 (now U.S. Pat. No. 11,968,520, issued on 2024 Apr. 23), which is a 35 U.S.C. § 371 National Stage of International Patent Application No. PCT/EP2019/086877, filed on 2019 Dec. 20, which claims priority to U.S. provisional application No. 62/789,617, filed on 2019 Jan. 8. The above identified applications are incorporated by reference.

TECHNICAL FIELD

Disclosed are embodiments related to the rendering of spatially-heterogeneous audio elements.

BACKGROUND

People often perceive sound that is a sum of sound waves generated from different sound sources that are located on a certain surface or within a certain volume/area. Such surface or volume/area can be conceptually considered as a single audio element with a spatially-heterogeneous character (i.e., an audio element that has a certain amount of spatial source variation within its spatial extent).

The following is a list of examples of spatially-heterogeneous audio elements.

Crowd Sound: The sum of voice sounds that are generated by many individuals standing close to each other within a defined volume of a space and that reach a listener's two ears.

River Sound: The sum of water splattering sounds that are generated from the surface of a river and that reach a listener's two ears.

Beach Sound: The sum of sounds that are generated by ocean waves hitting the shore line of a beach and that reach a listener's two ears.

Water Fountain Sound: The sum of sounds that are generated by water streams hitting the surface of a water fountain and that reach a listener's two ears.

Busy Highway Sound: The sum of sounds that are generated by many cars and that reach a listener's two ears.

Some of these spatially-heterogeneous audio elements have a perceived spatially-heterogeneous character that does not change much along certain paths in a three-dimensional (3D) space. For example, the character of the sound of a river perceived by a listener walking alongside the river does not change significantly as the listener walks alongside the river. Similarly, the character of the sound of a beach perceived by a listener walking alongside the beachfront or the character of the sound of a crowd of people perceived by a listener walking around the crowd does not change much as the listener walks alongside the beachfront or around the crowd of people.

There are existing methods to represent an audio element that has a certain spatial extent, but the resulting representation does not maintain the spatially-heterogenous character of the audio element. One such existing method is to create multiple duplicates of a mono audio object at locations around the mono audio object. Having multiple duplicates of the mono audio object around the mono audio object creates the perception of a spatially homogenous audio object with a particular size. This concept is used in the "object spread" and "object divergence" features of the MPEG-H 3D Audio standard and in the "object divergence" feature of the EBU Audio Definition Model (ADM) standard.

Another way of using a mono audio object to represent an audio element with a spatial extent, although not maintaining its spatially-heterogeneous character, is described in IEEE Transactions on Visualization and Computer Graphics 22 (4): 1-1 entitled "Efficient HRTF-based Spatial Audio for Area and Volumetric Sources" published on January 2016, the entirety of which is hereby incorporated by this reference. Specifically, a mono audio object may be used to represent an audio element with spatial extent by projecting the area-volumetric geometry of a sound object onto a sphere around a listener and rendering sound to the listener through using a pair of head-related (HR) filters that is evaluated as the integral of all the HR filters covering the geometric projection of the sound object on the sphere. For a spherical volumetric source, this integral has an analytical solution while for an arbitrary area-volumetric source geometry, the integral is evaluated by sampling the projected source surface on the sphere using what is called a Monte Carlo ray sampling.

Another one of the existing methods is to render a spatially diffuse component in addition to a mono audio signal such that the combination of the spatially diffuse component and the mono audio signal creates the perception of a somewhat diffuse object. In contrast to a single mono audio object, the diffuse object has no distinct pin-point location. This concept is used in the "object diffuseness" feature of the MPEG-H 3D Audio standard and the "object diffuseness" feature of the EBU ADM.

Combinations of the existing methods are also known. For example, the "object extent" feature of the EBU ADM combines the concept of creating multiple copies of a mono audio object with the concept of adding diffuse components.

SUMMARY

As described above, various techniques are known for representing an audio element. However, the majority of these known techniques are only able to render audio elements that have either a spatially-homogeneous character (i.e., no spatial variation within the audio elements) or a spatially diffuse character, which is too limited for rendering some of the examples given above in a convincing way. In other words, these known techniques do not allow rendering of audio elements that have a distinct spatially-heterogeneous character.

One way to create a notion of a spatially-heterogeneous audio element is by creating a spatially distributed cluster of multiple individual mono audio objects (essentially individual audio sources) and linking the multiple individual mono audio objects together at some higher level (e.g., using a scene graph or other grouping mechanism). However, this is not an efficient solution in many cases, particularly not for highly heterogeneous audio elements (i.e., audio elements comprising many individual sound sources, such as the examples listed above). Furthermore, in case the audio element to be rendered is a live-captured content, it may also be unfeasible or unpractical to record each of a plurality of audio sources forming the audio element separately.

Accordingly, there is a need for an improved method to provide efficient representation of a spatially-heterogeneous audio element and efficient dynamic 6-degrees-of-freedom (6DoF) rendering of the spatially-heterogeneous audio element. In particular, it is desirable to make the size of an audio element (e.g., width or height) perceived by a listener to correspond to different listening positions and/or orientations, and to maintain the perceived spatial character within the perceived size.

Embodiments of this disclosure allow efficient representation and efficient and dynamic 6DoF rendering of a spatially-heterogeneous audio element, which provide a listener of the audio element with a close-to-real sound experience that is spatially and conceptually consistent with the virtual environment the listener is in.

This efficient and dynamic representation and/or rendering of a spatially-heterogeneous audio element would be very useful for content creators, who would be able to incorporate spatially rich audio elements into a 6DoF scenario in a very efficient way for Virtual Reality (VR), Augmented Reality (AR), or Mixed Reality (MR) applications.

In some embodiments of this disclosure, a spatially-heterogeneous audio element is represented as a group of a small (e.g., equal to or greater than 2 but generally less than or equal to 6) number of audio signals which in combination provide a spatial image of the audio element. For example, the spatially-heterogeneous audio element may be represented as a stereophonic signal with associated metadata.

Furthermore, in some embodiments of this disclosure, a rendering mechanism may enable dynamic 6DoF rendering of the spatially-heterogeneous audio element such that the perceived spatial extent of the audio element is modified in a controlled way as the position and/or the orientation of the listener of the spatially-heterogeneous audio element changes while preserving the heterogeneous spatial characteristics of the spatially-heterogeneous audio element. This modification of the spatial extent may be dependent on the metadata of the spatially-heterogeneous audio element and the position and/or the orientation of the listener relative to the spatially-heterogeneous audio element.

In one aspect, there is a method for rendering a spatially-heterogeneous audio element for a user. In some embodiments, the method includes obtaining two or more audio signals representing the spatially-heterogeneous audio element, wherein a combination of the audio signals provides a spatial image of the spatially-heterogeneous audio element. The method also includes obtaining metadata associated with the spatially-heterogeneous audio element. The metadata may comprise spatial extent information specifying a spatial extent of the spatially-heterogeneous audio element. The method further includes rendering the audio element using: i) the spatial extent information and ii) location information indicating a position (e.g. virtual position) and/or an orientation of the user relative to the spatially-heterogeneous audio element.

In another aspect a computer program is provided. The computer program comprises instructions which when executed by processing circuitry causes the processing circuitry to perform the above described method. In another aspect a carrier is provided, which carrier contain the computer program. The carrier is one of an electronic signal, an optical signal, a radio signal, and a computer readable storage medium.

In another aspect there is provided an apparatus for rendering a spatially-heterogeneous audio element for a user. The apparatus being configured to: obtain two or more audio signals representing the spatially-heterogeneous audio element, wherein a combination of the audio signals provides a spatial image of the spatially-heterogeneous audio element; obtain metadata associated with the spatially-heterogeneous audio element, the metadata comprising spatial extent information indicating a spatial extent of the spatially-heterogeneous audio element; and render the spatially-heterogeneous audio element using: i) the spatial extent information and ii) location information indicating a position (e.g. virtual position) and/or an orientation of the user relative to the spatially-heterogeneous audio element.

In some embodiments the apparatus comprises a computer readable storage medium; and processing circuitry coupled to the computer readable storage medium, wherein the processing circuitry is configured to cause the apparatus to perform the methods described herein.

The embodiments of this disclosure provide at least the following two advantages.

Compared to the known solutions that extend the "size" of mono audio objects using associated "size," "spread," or "diffuseness" parameters, which result in spatially-homogeneous audio elements, the embodiments of this disclosure enable a representation and 6DoF rendering of audio elements with a distinct spatially-heterogeneous character.

Compared to the known solution of representing a spatially-heterogeneous audio element as a cluster of individual mono audio objects, the representation of the spatially-heterogeneous audio element based on the embodiments of this disclosure is more efficient with respect to representation, transport, and complexity of rendering.

BRIEF DESCRIPTION OF THE DRAWINGS

The accompanying drawings, which are incorporated herein and form part of the specification, illustrate various embodiments.

DETAILED DESCRIPTION

Figure 1:
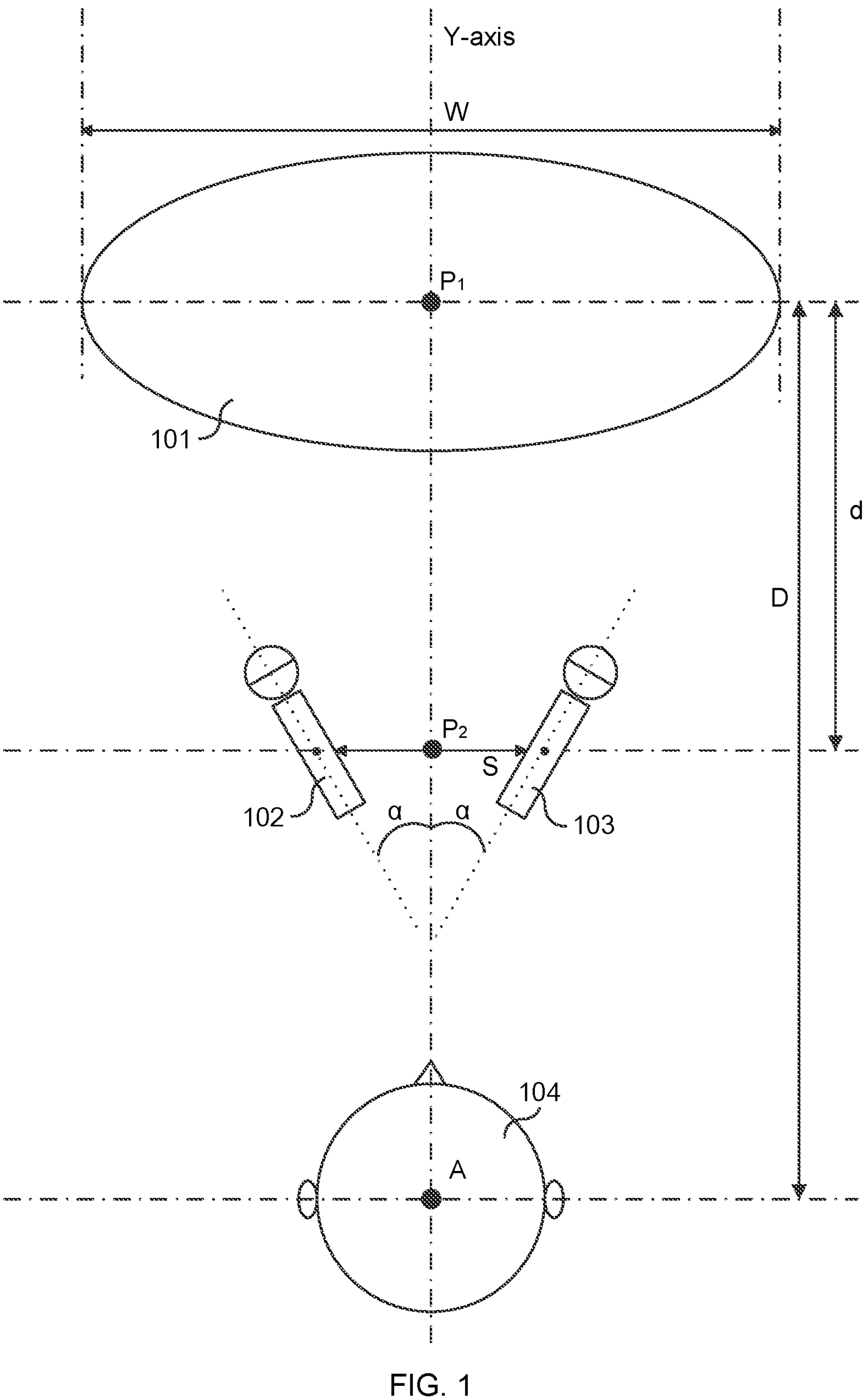
FIG. 1 illustrates a representation of a spatially-heterogeneous audio element according to some embodiments.

FIG. 1 illustrates a representation of a spatially-heterogeneous audio element 101. In one embodiment, the spatially-heterogeneous audio element may be represented as a stereo object. The stereo object may comprise a 2-channel stereo (e.g., left and right) signal and associated metadata. The stereo signal may be obtained from an actual stereo recording of a real audio element (e.g., crowd, busy highway, beach) using a stereophonic microphone setup or from artificial creation by mixing (e.g., stereo panning) individual (either recorded or generated) audio signals.

The associated metadata may provide information about the spatially-heterogeneous audio element 101 and its representation. As illustrated in FIG. 1, the metadata may include at least one or more of the following information:

(1) position $P_1$ of the notional spatial center of the spatially-heterogeneous audio element;

(2) spatial extent of the spatially-heterogeneous audio element (e.g., spatial width W);

(3) the setup (e.g., a spacing S and orientation α) of microphones 102 and 103 (either virtual or real microphones) used to record the spatially-heterogeneous audio element;

(4) the type of microphones 102 and 103 (e.g., omni, cardioid, figure-of-eight);

(5) the relationship between microphones 102 and 103, and spatially-heterogeneous audio element 101—e.g., a distance d between position $P_1$ of the notational center of audio element 101 and position $P_2$ of microphones 102 and 103, and an orientation of microphones 102 and 103 (e.g., orientation α) relative to a reference axis (e.g., Y-axis) of spatially-heterogeneous audio element 101;

(6) a default listening position (e.g., position P2); and (7) a relationship between P1 and P2 (e.g., distance d).

The spatial extent of the spatially-heterogeneous audio element 101 may be provided as an absolute size (e.g., in meters) or in a relative size (e.g., angular width with respect to a reference position such as a capturing or a default observation position). Also, spatial extent may be specified as a single value (e.g., specifying spatial extent in a single dimension or specifying spatial extent that is to be used for all dimensions) or as multiple values (e.g., specifying separate spatial extents for different dimensions).

In some embodiments, the spatial extent may be the actual physical size/dimension of the spatially-heterogeneous audio element 101 (e.g., a water fountain). In other embodiments, spatial extent may represent the spatial extent perceived by a listener. For example, if an audio element is the sea or a river, the listener cannot perceive the overall width/dimension of the sea or the river but can perceive only a part of the sea or the river that is near to the listener. In such case, the listener would hear sound from only a certain spatial section of the sea or the river, and thus the audio element may be represented as the spatial width perceived by the listener.

Figure 2:
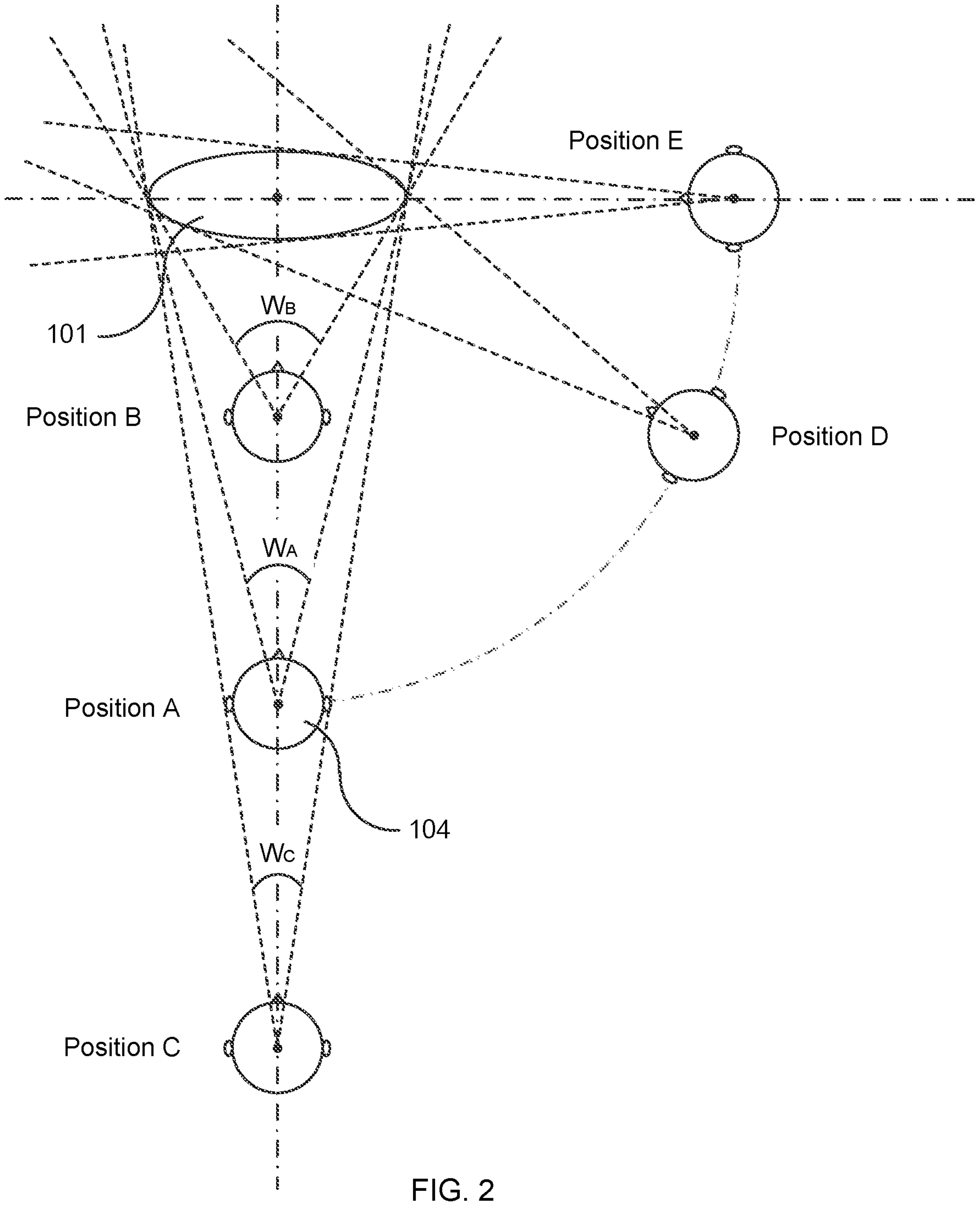
FIG. 2 illustrates modifications of a representation of a spatially-heterogeneous audio element according to some embodiments.

FIG. 2 illustrates modifications of the representation of the spatially-heterogeneous audio element 101 based on dynamic changes in the position of listener 104. In FIG. 2, listener 104 is initially positioned at virtual position A and at an initial virtual orientation (e.g., the vertical direction from listener 104 to spatially-heterogeneous audio element 101). Position A may be the default position that is specified in the metadata for the spatially-heterogeneous audio element 101 (likewise, the initial orientation of the listener 104 may be equal to the default orientation specified in the metadata). Assuming the listener's initial position and orientation match the defaults, then a stereo signal representing spatially-heterogeneous audio element 101 may be provided to listener 104 without any modification, and, thus, listener 104 will experience a default spatial audio representation of spatially-heterogeneous audio element 101.

When listener 104 moves from virtual position A to virtual position B, which is closer to spatially-heterogeneous audio element 101, it is desirable to change the audio experience perceived by listener 104 based on the change in the listener 104's position. Thus, it is desirable to specify spatial width $W_B$ of spatially-heterogeneous audio element 101 perceived by listener 104 at position B to be wider than spatial width $W_A$ of audio element 101 perceived by listener 104 at virtual position A. Similarly, it is desirable to specify spatial width $W_C$ of audio element 101 perceived by listener 104 at position C to be narrower than spatial width $W_A$.

Accordingly, in some embodiments, the spatial extent of the spatially-heterogeneous audio element perceived by the listener is updated based on the position and/or the orientation of the listener with respect to the spatially-heterogeneous audio element and the metadata of the spatially-heterogeneous audio element (e.g., information indicating a default position and/or orientation with respect to the spatially-heterogeneous audio element). As explained above, the metadata of the spatially-heterogeneous audio element may include spatial extent information regarding a default spatial extent of the spatially-heterogeneous audio element, the position of a notional center of the spatially-heterogeneous audio element, and a default position and/or orientation. A modified spatial extent may be obtained by modifying the default spatial extent based on the detection of changes in the position and the orientation of the listener with respect to the default position and the default orientation.

Figure 3A:
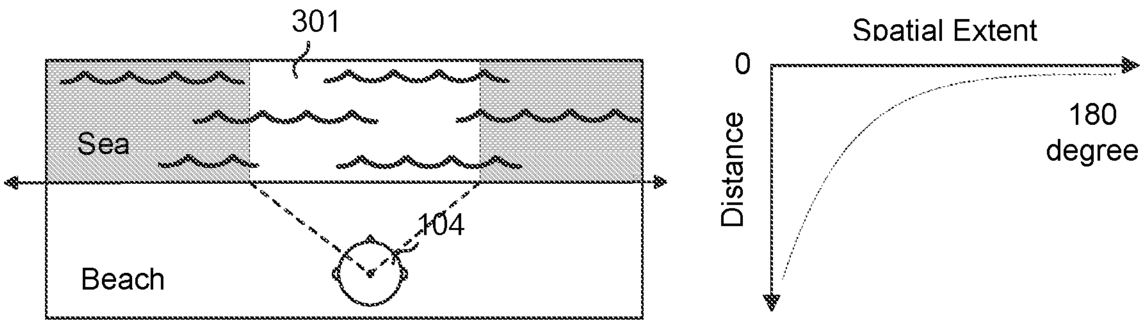
FIGS. 3A, 3B, and 3C illustrate a method of modifying spatial extent of a spatially-heterogeneous audio element according to some embodiments.
Figure 3B:
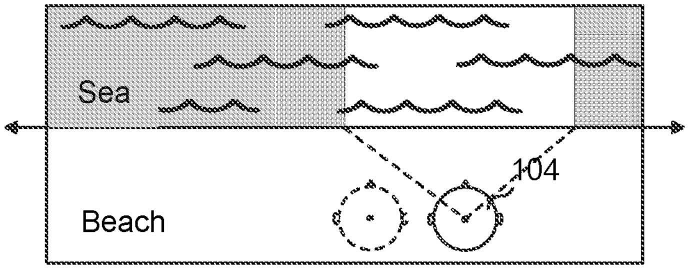
Figure 3C:
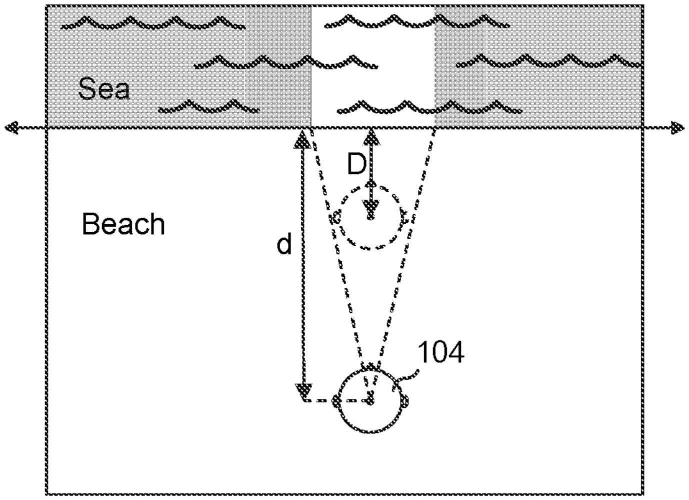

In other embodiments, a representation of a spatially-heterogeneous expansive audio element (e.g., a river, a sea) represents only a perceivable section of the spatially-heterogeneous expansive audio element. In such embodiments, a default spatial extent may be modified in a different way as illustrated in FIGS. 3A-3C. As shown in FIGS. 3A and 3B, as listener 104 moves alongside a spatially-heterogeneous expansive audio element 301, the representation of the spatially-heterogeneous expansive audio element 301 may move with listener 104. Thus, the audio rendered to listener 104 is basically independent of the position of listener 104 with respect to a particular axis (e.g., a horizontal axis in FIG. 3A). In this case, as shown in FIG. 3C, the spatial extent perceived by listener 104 may be modified solely based on a comparison of a perpendicular distance d between listener 104 and spatially-heterogeneous expansive audio element 301, and a reference perpendicular distance D between listener 104 and spatially-heterogeneous expansive audio element 301. The reference perpendicular distance D may be obtained from the metadata of spatially-heterogeneous expansive audio element 301.

For example, referring to FIG. 3C, the modified spatial extent perceived by listener 104 may be determined according to a function of SE=RE*f(d,D) where SE is the modified spatial extent, RE is a default (or reference) spatial extent obtained from the metadata of spatially-heterogeneous expansive audio element 301, d is the perpendicular distance between spatially-heterogeneous expansive audio element 301 and the current position of listener 104, D is the perpendicular distance between spatially-heterogeneous expansive audio element 301 and a default position specified in the metadata, and f is the function that defines a curve having d and D as its parameters. The function f may take many shapes such as a linear relationship or a non-linear curve. An example of the curve is shown in FIG. 3A.

The curve may show that the spatial extent of a spatially-heterogeneous expansive audio element 301 is close to zero at a very large distance from the spatially-heterogeneous expansive audio element 301 and is close to 180 degrees at a distance close to zero. In a case where the spatially-heterogeneous expansive audio element 301 represents a very large real-life element such as sea, as shown in FIG. 3A, the curve may be such that the spatial extent increases gradually as the listener moves closer to the sea (reaching 180 degrees when the listener arrives at the shore). In a case where the spatially-heterogeneous expansive audio element 301 represents a smaller real-life element such as a water fountain, the curve may be strongly non-linear such that the spatial extent is very narrow at a large distance from the spatially-heterogeneous expansive audio element 301, but becomes wider very quickly near the spatially-heterogeneous expansive audio element 301.

The function f may also depend on the listener's angle of observation of the audio element, especially when the spatially-heterogeneous expansive audio element 301 is small.

The curve may be provided as a part of the metadata of the spatially-heterogeneous expansive audio element 301 or may be stored or provided in an audio renderer. A content creator wishing to implement a modification of spatial extent of a spatially-heterogeneous expansive audio element 301 may be given the choice between various shapes of the curve based on a desired rendering of the spatially-heterogeneous expansive audio element 301.

Figure 4:
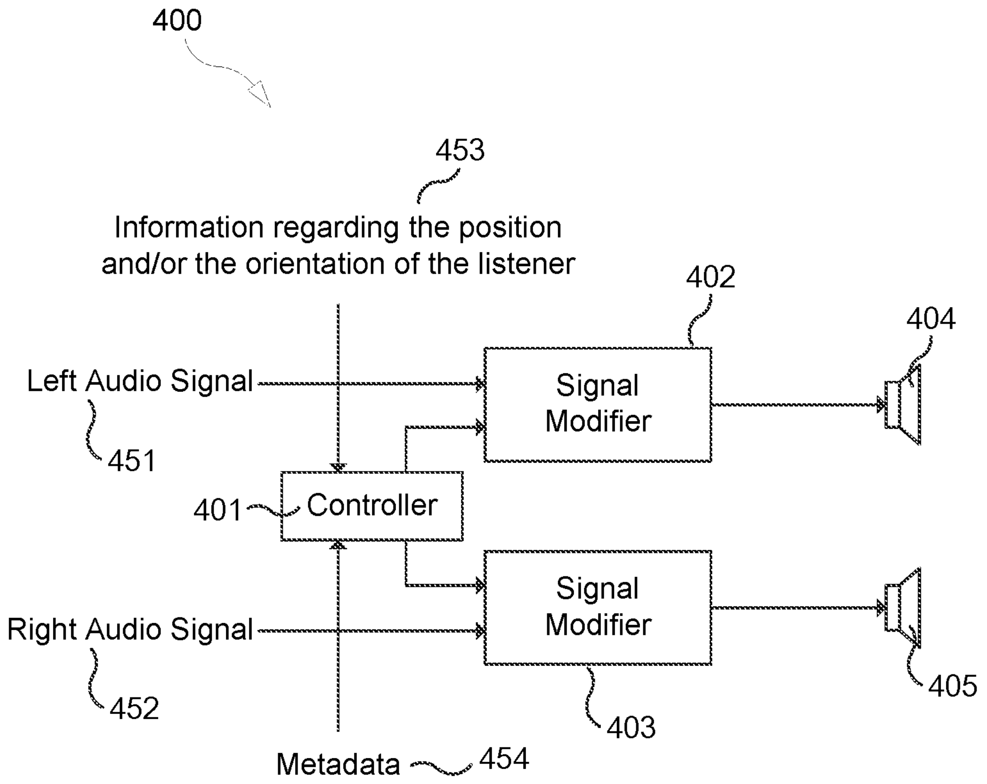
FIG. 4 illustrates a system for rendering of a spatially-heterogeneous audio element according to some embodiments.

FIG. 4 shows a system 400 for rendering of a spatially-heterogeneous audio element according to some embodiments. System 400 includes a controller 401, a signal modifier 402 for a left audio signal 451, a signal modifier 403 for a right audio signal 452, a speaker 404 for left audio signal 451, and a speaker 405 for right audio signal 452. Left audio signal 451 and right audio signal 452 represent the spatially-heterogeneous audio element at a default position and at a default orientation. While only two audio signals, two modifiers, and two speakers are shown in FIG. 4, this is for illustration purpose only and does not limit the embodiments of the present disclosure in any way. Furthermore, even though FIG. 4 shows that system 400 receives and modifies left audio signal 451 and right audio signal 452 separately, system 400 may receive a single stereo signal including the contents of left audio signal 451 and right audio signal 452 and modify the stereo signal without separately modifying left audio signal 451 and right audio signal 452.

Controller 401 may be configured to receive one or more parameters and to trigger modifiers 402 and 403 to perform modifications on left and right audio signals 451 and 452 based on the received parameters. In the embodiments shown in FIG. 4, the received parameters are (1) information 453 regarding the position and/or the orientation of the listener of the spatially-heterogeneous audio element and (2) metadata 454 of the spatially-heterogeneous audio element.

Figure 5A:
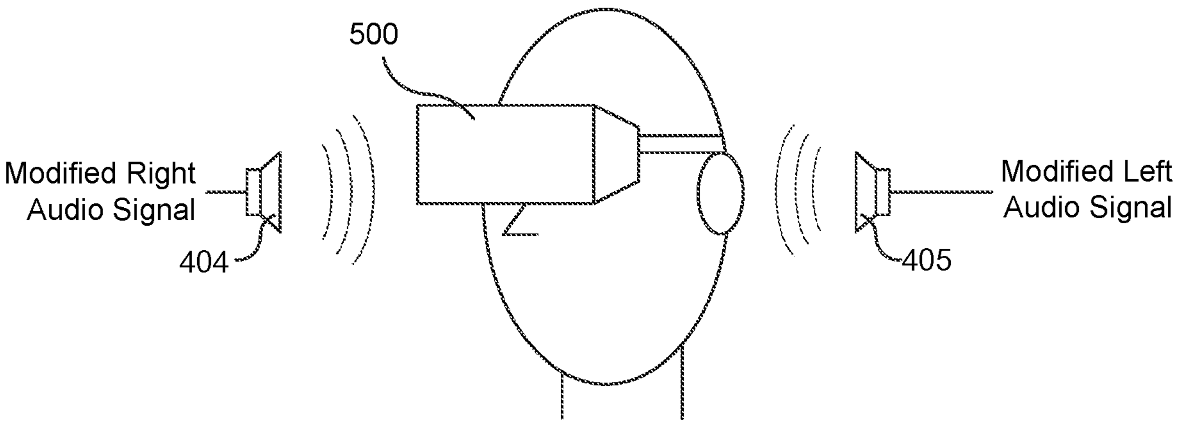
FIGS. 5A and 5B illustrate a virtual reality (VR) system according to some embodiments.
Figure 5B:
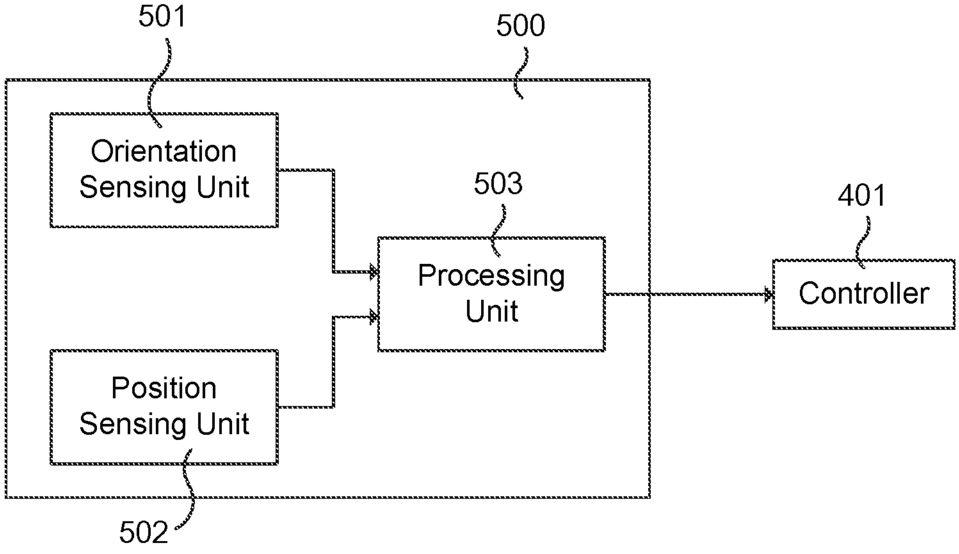

In some embodiments of this disclosure, information 453 may be provided from one or more sensors included in a virtual reality (VR) system 500 illustrated in FIG. 5A. As shown in FIG. 5A, VR system 500 is configured to be worn by a user. As shown in FIG. 5B, VR system 500 may comprise an orientation sensing unit 501, a position sensing unit 502, and a processing unit 503 coupled to controller 401 of system 400. Orientation sensing unit 501 is configured to detect a change in the orientation of the listener and provides information regarding the detected change to processing unit 503. In some embodiments, processing unit 503 determines the absolute orientation (in relation to some coordinate system) given the detected change in orientation detected by orientation sensing unit 501. There could also be different systems for determination of orientation and position, e.g. the HTC Vive system using lighthouse trackers (lidar). In one embodiment, orientation sensing unit 501 may determine the absolute orientation (in relation to some coordinate system) given the detected change in orientation. In this case the processing unit 503 may simply multiplex the absolute orientation data from orientation sensing unit 501 and the absolute positional data from position sensing unit 502. In some embodiments, orientation sensing unit 501 may comprise one or more accelerometers and/or one or more gyroscopes.

Figure 6A:
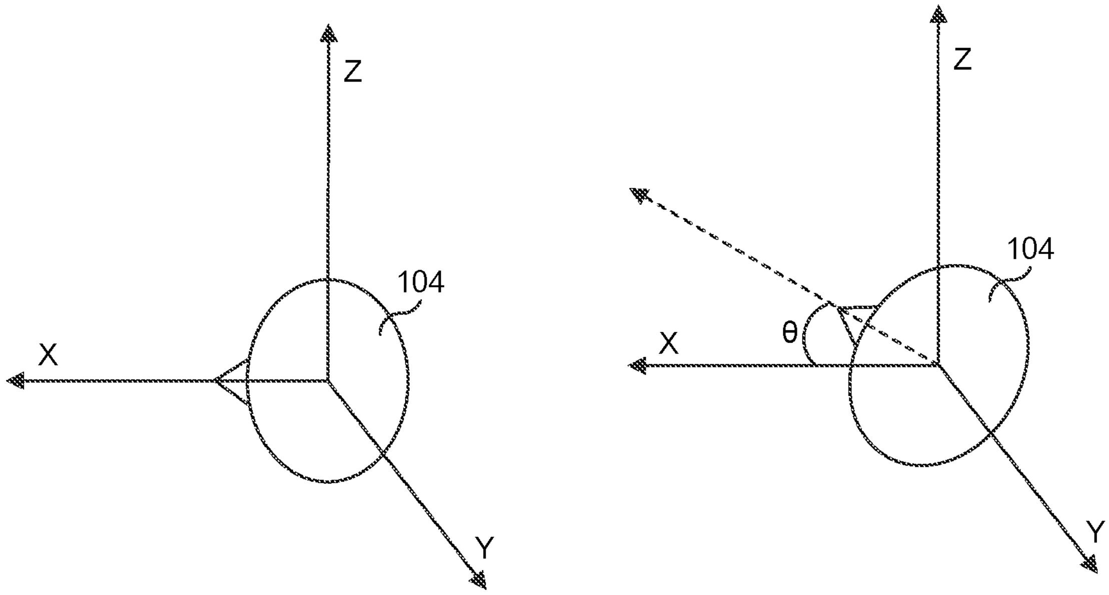
FIGS. 6A and 6B illustrate a method of determining the orientation of a listener according to some embodiments.
Figure 6B:
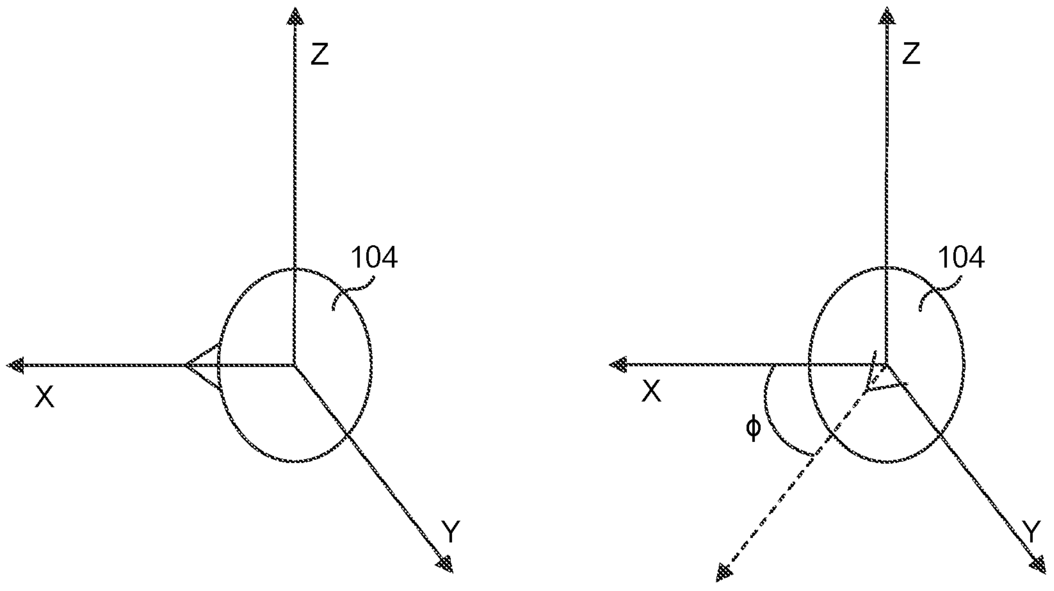

FIGS. 6A and 6B illustrate exemplary methods of determining the orientation of the listener.

In FIG. 6A, the default orientation of listener 104 is in the direction of X-axis. As listener 104 lifts his/her head with respect to X-Y plane, orientation sensing unit 501 detects the angle θ with respect X-Y plane. Orientation sensing unit 501 may also detect a change of the orientation of listener 104 with respect to a different axis. For example, in FIG. 6B, as listener 104 rotates his/her head with respect to X-axis, orientation sensing unit 501 detects the angle Φ with respect to X-axis. Similarly, an angle ψ with respect to the Y-Z plane, obtained when the listener rolls his/her head around the X axis may be detected by the orientation sensing unit 501. These angles θ, Φ, and ψ detected by orientation sensing unit 501 represent the orientation of listener 104.

Referring back to FIG. 5B, in addition to orientation sensing unit 501, VR system 500 may further comprise position sensing unit 502. Position sensing unit 502 determines the position of listener 104 as illustrated in FIG. 2. For example, position sensing unit 502 may detect the position of listener 104 and position information indicating the detected position can be provided to controller 401 via position sensing unit 502 such that when listener 104 moves from position A to position B, the distance between the center of spatially-heterogeneous audio element 101 and listener 104 may be determined by controller 401.

Accordingly, the angles θ, Φ and ψ detected by orientation sensing unit 501 and the position of listener 104 detected by position sensing unit 502 may be provided to processing unit 503 in VR system 500. Processing unit 503 may provide to controller 401 of system 400 information regarding the detected angles and the detected position. Given 1) the absolute position and orientation of the spatially-heterogeneous audio element 101, 2) the spatial extent of the spatially-heterogeneous audio element 101 and 3) the absolute position of the listener 104, the distance from the listener 104 to the spatially-heterogeneous audio element 101 can be evaluated as well as the spatial width perceived by the listener 104.

Referring back to FIG. 4, metadata 454 may include various information. Examples of the information included in metadata 454 are provided above. Upon receiving information 453 and metadata 454, controller 401 triggers modifiers 402 and 403 to modify left audio signal 451 and right audio signal 452. Modifiers 402 and 403 modify left audio signal 451 and right audio signal 452 based on the information provided from controller 401 and output modified audio signals to speakers 404 and 405 such that the listener perceives a modified spatial extent of the spatially-heterogeneous audio element.

Rendering a Spatially-Heterogeneous Audio Element

There are many ways to render a spatially-heterogeneous audio element. One way of rendering a spatially-heterogeneous audio element is by representing each of audio channels as a virtual speaker and render the virtual speakers binaurally to the listener or render them onto physical loudspeakers, e.g. using panning techniques. For example, two audio signals representing a spatially-heterogeneous audio element may be generated as if they are outputted from two virtual loudspeakers at fixed positions. However, in such configuration, the acoustic transmission times from the two fixed loudspeakers to the listener would change as the listener moves. Because of the correlation and temporal relationship between the two audio signals outputted from the two fixed loudspeakers, such change of the acoustic transmission times would result in severe coloration and/or distortion of a spatial image of the spatially-heterogeneous audio element.

Figure 7A:
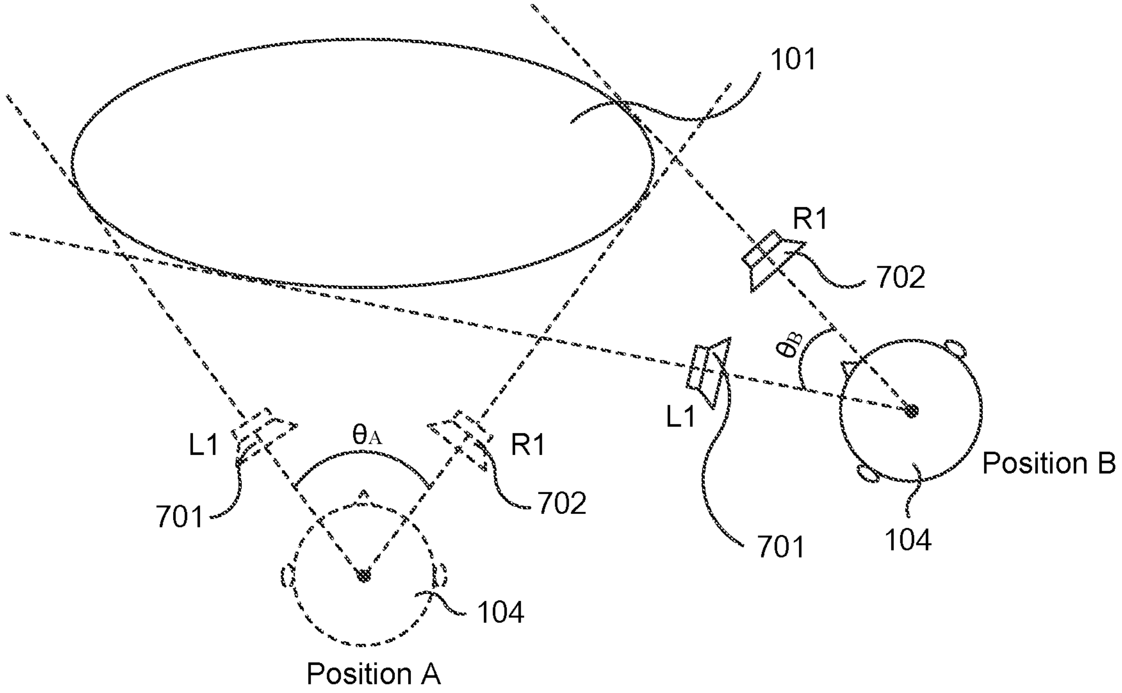
FIGS. 7A, 7B, and 8 illustrate methods of modifying the arrangement of virtual speakers.

Accordingly, in the embodiments shown in FIG. 7A, the positions of virtual loudspeakers 701 and 702 are dynamically updated as listener 104 moves from position A to position B while virtual loudspeakers 701 and 702 are maintained at equidistant from listener 104. This concept allows the audio rendered by virtual loudspeakers 701 and 702 to be perceived by listener 104 to match the position and the spatial extent of spatially-heterogeneous audio element 101 from listener 104's perspective. As shown in FIG. 7A, the angle between virtual loudspeakers 701 and 702 may be controlled such that it always corresponds to the spatial extent (e.g., spatial width) of spatially-heterogeneous audio element 101 from listener 104's perspective. In other words, even though the distance between virtual loudspeakers 701 and 702 and listener 104 at position B is same as the distance between virtual loudspeakers 701 and 702 and listener 104 at position A, the angle between virtual loudspeakers 701 and 702 is changed to from 8A to OB as listener moves from position A to position B. This change of angle corresponds to a decreased spatial width perceived by listener 104.

Figure 8:
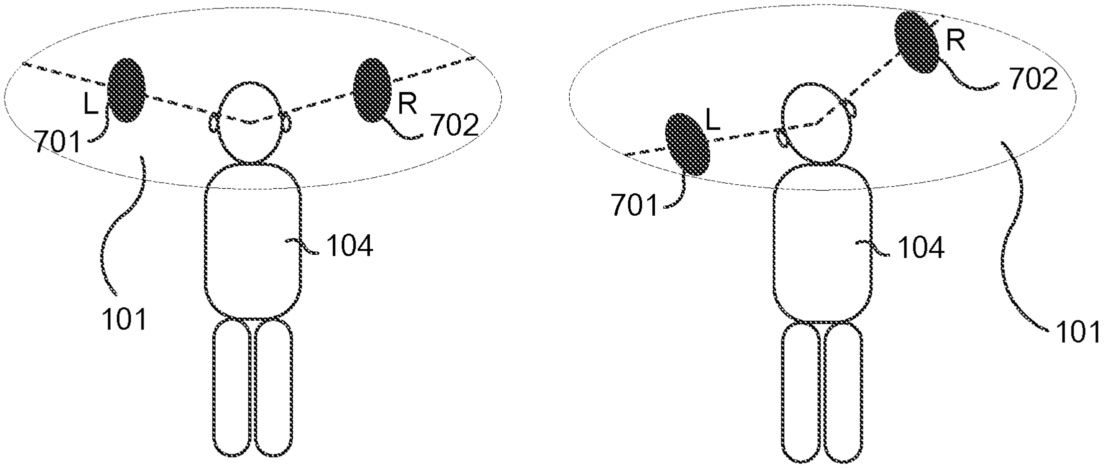

The position and the orientation of virtual loudspeakers 701 and 702 may also be controlled based on the head pose of listener 104. FIG. 8 illustrates an example of how virtual loudspeakers 701 and 702 may be controlled based on the head pose of listener 104. In the embodiment shown in FIG. 8, as listener 104 tilts his/her head, the positions of virtual loudspeakers 701 and 702 are controlled so that the stereo width of the stereo signal may correspond to the height or width of spatially-heterogeneous audio element 101.

In other embodiments of this disclosure, the angle between virtual loudspeakers 701 and 702 may be fixed to a particular angle (e.g., a standard stereo angle of + or −30 degrees) and the spatial width of spatially-heterogeneous audio element 101 perceived by listener 104 may be changed by modifying the signals emitted from virtual loudspeakers 701 and 702. For example, in FIG. 7B, even when listener 104 moves from position A to position B, the angle between virtual loudspeakers 701 and 702 remains the same. Thus, the angle between virtual loudspeakers 701 and 702 no longer corresponds to the spatial extent of spatially-heterogeneous audio element 101 from listener 104's modified perspective. However, because the audio signals emitted from virtual loudspeakers 701 and 702 are modified, the spatial extent of spatially-heterogeneous audio element 101 would be perceived differently by listener 104 at position B. This method has the advantage that no undesirable artifacts occurs when the perceived spatial extent of spatially-heterogeneous audio element 101 changes due to a change of a listener's position (e.g., when moving closer to or further away from an spatially-heterogeneous audio element 101, or when the metadata specifies a different spatial extent for the spatially-heterogeneous audio element for different observation angles).

Figure 7B:
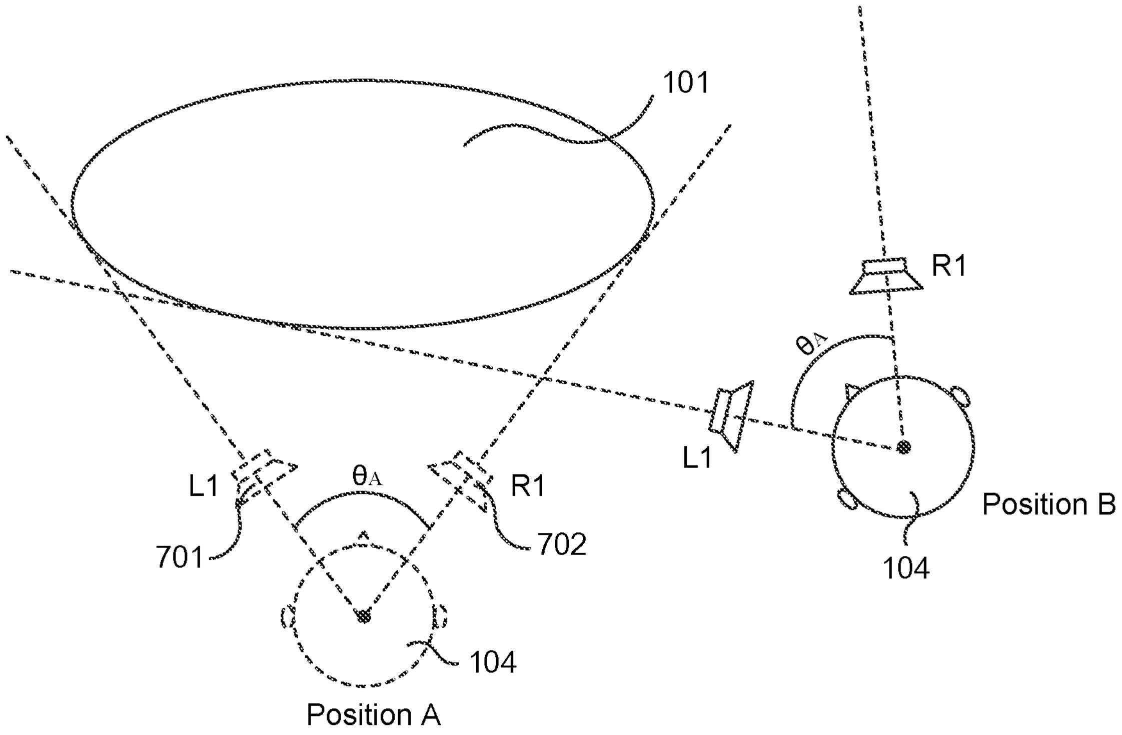

In the embodiments shown in FIG. 7B, the spatial extent of spatially-heterogeneous audio element 101 perceived by listener 104 may be controlled by applying a remixing operation to audio element 101's left and right audio signals. For example, the modified left and right audio signals may be expressed as:

$$L'=H_{LL}L+H_{LR}R \text{ and } R'=H_{RL}L+H_{RR}R, \text{ or}$$

$$\text{in matrix notation}(L'R')^T=H^*(LR)^T$$

where L and R are default left and right audio signals for audio element 101 in its default representation and L' and R' are modified left and right audio signals for audio element 101 perceived at the changed position and/or orientation of listener 104. H is a transformation matrix for transforming the default left and right audio signals into the modified left and right audio signals.

The transformation matrix H may depend on the position and/or the orientation of listener 104 relative to spatially-heterogeneous audio element 101. Additionally, the transformation matrix H may also be determined based on information included in the metadata of spatially-heterogeneous audio element 101 (e.g., information about the setup of microphones used to record the audio signals).

Many different mixing algorithms and combinations thereof may be used to implement the transformation matrix H. In some embodiments, the transformation matrix H may be implemented by one or more of algorithms known for widening and/or narrowing a stereo image of a stereo signal. The algorithms may be suitable for modifying the perceived stereo width of a spatially-heterogeneous audio element when the listener of the spatially-heterogeneous audio element moves closer to or further away from the spatially-heterogeneous audio element.

One example of such algorithm is to decompose a stereo signal into sum and difference signals (also often called as "Mid" and "Side" signals) and to change the balance of these two signals to achieve a controllable width of a stereo image of an audio element. In some embodiments, the original stereo representation of a spatially-heterogeneous audio element may already be in sum-difference (or mid-side) format, in which case the decomposition step mentioned above may not be required.

For instance, referring to FIG. 2, at reference position A, the sum and difference signals may be mixed in equal proportions (with opposite polarity of the difference signal in the left and right signals), resulting in default left and right signals. However, at position B which is closer to spatially-heterogeneous audio element 101 than position A, more weight is given to the difference signal than the sum signal, resulting in a spatial image that is wider than the default one. On the other hand, at position C which is further from spatially-heterogeneous audio element 101 than position A, more weight is given to the sum signal than the difference signal, resulting in a narrower spatial image. Accordingly, by controlling the balance between the sum and difference signals, the perceived spatial width may be controlled in response to the change of the distance between listener 104 and spatially-heterogeneous audio element 101.

The aforementioned technique may also be used to modify the spatial width of a spatially-heterogeneous audio element when the relative angle between the listener and the spatially-heterogeneous audio element changes, i.e. the listener's observation angle changes. FIG. 2 shows a user 104 position D that is at the same distance from spatially-heterogeneous audio element 101 as the reference position A, but at a different angle. As shown in FIG. 2, at position D, a narrower spatial image might be expected than at position A. This different spatial image may be rendered by changing the relative proportions of the sum and difference signals. Specifically, less of the difference signal would be used for position D to result in a narrower image.

In some embodiments of the present disclosure, decorrelation technique may be used to increase the spatial width of a stereo signal as described in U.S. Pat. No. 7,440,575, U.S. Patent Pub. 2010/0040243 A1, and WIPO Patent Publication 2009102750A1, the entireties of which are hereby incorporated by this reference.

In other embodiments of this disclosure, different techniques of widening and/or narrowing a stereo image may be used as described in U.S. Pat. No. 8,660,271, U.S. Patent Pub. No. 2011/0194712, U.S. Pat. Nos. 6,928,168, 5,892,830, U.S. Patent Pub. No. 2009/0136066, U.S. Pat. No. 9,398,391B2, U.S. Pat. No. 7,440,575, and German Patent Publication DE 3840766A1, the entireties of which are hereby incorporated by this reference.

Note that the remixing processing (including the example algorithms described above) may include filtering operations, so that in general the transformation matrix H is complex and frequency-dependent. The transformation may be applied in the time domain, including potential filtering operations (convolution), or in a similar form in a transform domain, e.g. the Discrete Fourier Transform (DFT) or the Modified Discrete Cosine Transform (MDCT) domains, on transform domain signals.

Figure 9:
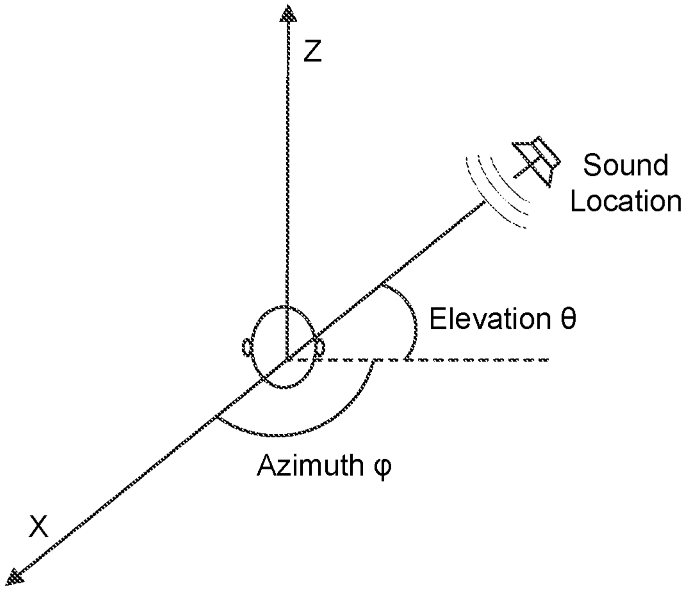
FIG. 9 illustrates parameters of a Head Related Transfer Function (HRTF) filter.

In some embodiments, a spatially-heterogeneous audio element may be rendered using a single Head Related Transfer Function (HRTF) filter pair. FIG. 9 illustrates the azimuth (φ) and elevation (2) parameters of an HRTF filter. As described above, when a spatially-heterogeneous audio element is represented by a left signal L and a right signal R, the left and right signals modified based on the change of the listener's orientation and/or position may be expressed as a modified left signal L' and a modified right signal R' where $(L'\ R')^T=H*(L\ R)^T$ and H is a transformation matrix. In these embodiments, HRTF filtering is applied to the modified left signal L' and the modified right signal R' such that the left-ear audio signal $E_L$ and the right-ear audio signal $E_R$ may be outputted to the listener. $E_L$ and $E_R$ may be expressed as following:

$$E_L(\varphi, \theta, x, y, z) = L'(x, y, z) * HRTF_L(\varphi_L, \theta_L)$$

$$E_R(\varphi, \theta, x, y, z) = R'(x, y, z) * HRTF_R(\varphi_R, \theta_R)$$

$HRTF_L$ is a left ear HRTF filter corresponding to a virtual point audio source located at a particular azimuth ($\varphi_L$) and a particular elevation ($\theta_L$) with respect to listener of audio source. Similarly, $HRTF_R$ is a right car HRTF filter corresponding to a virtual point audio source located at a particular azimuth ($\varphi_R$) and a particular elevation ($\theta_R$) with respect to listener of the audio source. X, y and z represent the position of a listener with respect to the default position (a.k.a., "default observational position"). In one specific embodiment the modified left signal L' and the modified right signal R' are rendered at the same location, i.e. $\varphi_R=\varphi_L$ and $\theta_R=\theta_L$.

In some embodiments, the Ambisonics format may be used as an intermediate format before or as part of a binaural rendering or conversion to a multi-channel format for a specific virtual loudspeaker setup. For example, in the embodiments described above, the modified left and right audio signals L' and R' may be converted to the Ambisonics domain and then rendered binaurally or for loudspeakers. Spatially-heterogeneous audio elements may be converted to the Ambisonics domain in different ways. For example, a spatially-heterogeneous audio element may be rendered using virtual loudspeakers each of which is treated as a point source. In such case, each of the virtual loudspeakers may be converted to the Ambisonics domain using known methods.

In some embodiments, more advanced techniques may be used to calculate HRTFs as described in IEEE Transactions on Visualization and Computer Graphics 22 (4): 1-1 entitled "Efficient HRTF-based Spatial Audio for Area and Volumetric Sources" published on January 2016.

In some embodiments of the present disclosure, an spatially-heterogeneous audio element may represent a single physical entity that comprises multiple sound sources (e.g., a car which has engine and exhaust sound sources) instead of an environmental element (e.g., sea or a river) or a conceptual entity consisting of multiple physical entities occupying some area in a scene (e.g., a crowd). The methods of rendering a spatially-heterogeneous audio element described above may also be applicable to such single physical entity that comprises multiple sound sources and has a distinct spatial layout. For example, when a listener is standing toward a vehicle at the driver side of the vehicle and the vehicle generates a first sound at the left side of the listener (e.g., engine sound from the front side of the vehicle) and a second sound at the right side of the listener (e.g., exhaust sound from the back side of the vehicle), the listener may perceive a distinct spatial audio layout of the vehicle based on the first and the second sounds. In such case, it is desirable to allow the listener to perceive the distinct spatial layout even if the listener moves around the vehicle and observes it from the opposite side of the vehicle (e.g., the front passenger side of the vehicle). Thus, in some embodiments of this disclosure, the left audio channel and the right audio channel are swapped when the listener moves from one side (e.g., the driver side of the vehicle) to the opposite side (e.g., the front passenger side of the vehicle). In other words, as the listener moves from one side to the opposite side, the spatial representation of the spatially-heterogeneous audio element is mirrored around an axis of the vehicle.

However, if the left and the right channels are swapped instantaneously at the moment when the listener moves from one side to the opposite side, the listener may perceive a discontinuity of a spatial image of the spatially-heterogeneous audio element. Accordingly, in some embodiments, a small amount of decorrelated signal may be added to a modified stereo mix while the listener is in a small transitional region between the two sides.

In some embodiments of this disclosure, an additional feature of preventing the rendering of a spatially-heterogeneous audio element from being collapsed into mono is provided. For example, referring to FIG. 2, if spatially-heterogeneous audio element 101 is an one-dimensional audio element that has spatial extent only in a single direction (e.g., the horizontal direction in FIG. 2), the rendering of spatially-heterogeneous audio element 101 would be collapsed to mono when listener 104 moves to position E because there would be no perceived spatial extent of spatially-heterogeneous audio element 101 at position E. This may be undesirable because mono may sound unnatural to listener 104. To prevent this collapse, the embodiments of this disclosure provide a lower limit on the spatial width or a defined small region around position E such that modification of spatial extent within the defined small region is prevented. Alternatively or additionally, this collapse may be prevented by adding a small amount of decorrelated signal to the rendered audio signal in a small transitional region. This ensures that no unnatural collapse to mono occurs.

In some embodiments of this disclosure, the metadata of a spatially-heterogeneous audio element may also contain information indicating whether different types of modifications of a stereo image should be applied when the position and/or the orientation of a listener changes. Specifically, for particular types of spatially-heterogeneous audio elements, it may not be desirable to change the spatial width of the spatially-heterogeneous audio elements based on the change of the position and/or the orientation of the listener or to swap left and right channels as the listener moves from one side of the spatially-heterogeneous audio elements to the opposite side of the spatially-heterogeneous audio elements. Also, for particular types of audio elements, it may be desirable to modify the spatial extents of the spatially-heterogeneous audio elements along just one dimension.

For example, a crowd usually occupies a 2D space rather than being aligned along a straight line. Thus, if the spatial extent is only specified in one dimension it would be quite unnatural if the stereo width of the crowd spatially-heterogeneous audio element would be noticeably narrowed when the user moves around the crowd. Also, the spatial and temporal information coming from a crowd is typically random and not very orientation-specific, and thus a single stereo recording of the crowd may be perfectly suitable for representing it at any relative user angle. Therefore, the metadata for the crowd spatially-heterogeneous audio element may include information indicating that the modification of the stereo width of the crowd spatially-heterogeneous audio element should be disabled even if there is a change in the relative position of the listener of the crowd spatially-heterogeneous audio element. Alternatively or additionally, the metadata may also include information indicating that a specific modification of the stereo width should be applied in case there is a change in the relative position of the listener. The aforementioned information may also be included in the metadata of spatially-heterogeneous audio elements that represent merely a perceivable section of a huge real-life element such as a highway, sea, and a river.

In other embodiments of this disclosure, the metadata of particular types of spatially-heterogeneous audio elements may contain position-dependent, direction-dependent, or distance-dependent information specifying spatial extent of the spatially-heterogeneous audio element. For example, for a spatially-heterogeneous audio element representing the sound of a crowd, the metadata of the spatially-heterogeneous audio element may comprise information specifying a first particular spatial width of the spatially-heterogeneous audio element when the listener of the spatially-heterogeneous audio element is located at a first reference point and a second particular spatial width of the spatially-heterogeneous audio element when the listener of the spatially-heterogeneous audio element is located at a second reference point different from the first reference point. In this way, spatially-heterogeneous audio elements without observation angle-specific auditory events but with observation angle-specific widths can be efficiently represented.

Even though the embodiments of this disclosure described in the preceding paragraphs are explained using spatially-heterogeneous audio elements that have spatially-heterogeneous characteristics along one or two dimensions, the embodiments of this disclosure are equally applicable to spatially-heterogeneous audio elements that have spatially-heterogeneous characteristics along more than two dimensions by adding corresponding stereo signals and metadata for the additional dimensions. In other words, the embodiments of this disclosure are applicable to a spatially-heterogeneous audio elements that are represented by a multi-channel stereophonic signal. i.e. a multi-channel signal that uses stereophonic panning techniques (so the whole spectrum including stereo, 5.1, 7.x, 22.2, VBAP, etc.). Additionally or alternatively, the spatially-heterogeneous audio elements may be represented in a first-order ambisonics B-format representation.

In further embodiments of this disclosure, the stereophonic signals representing a spatially-heterogeneous audio element are encoded such that redundancy in the signals is exploited by, for example, using joint-stereo coding techniques. This feature provides a further advantage compared to encoding the spatially-heterogeneous audio element as a cluster of multiple individual objects.

In the embodiments of this disclosure, the spatially-heterogeneous audio elements to be represented are spatially rich but exact positioning of various audio sources within the spatially-heterogeneous audio elements is not critical. However, the embodiments of this disclosure may also be used to represent spatially-heterogeneous audio elements that contain one or more critical audio sources. In such case, the critical audio sources may be represented explicitly as individual objects that are superimposed on the spatially-heterogeneous audio element in the rendering of the spatially-heterogeneous audio element. Examples of such cases are a crowd where one voice or sound is consistently standing out (e.g., someone speaking through a megaphone) or a beach scene with a barking dog.

Figure 10:
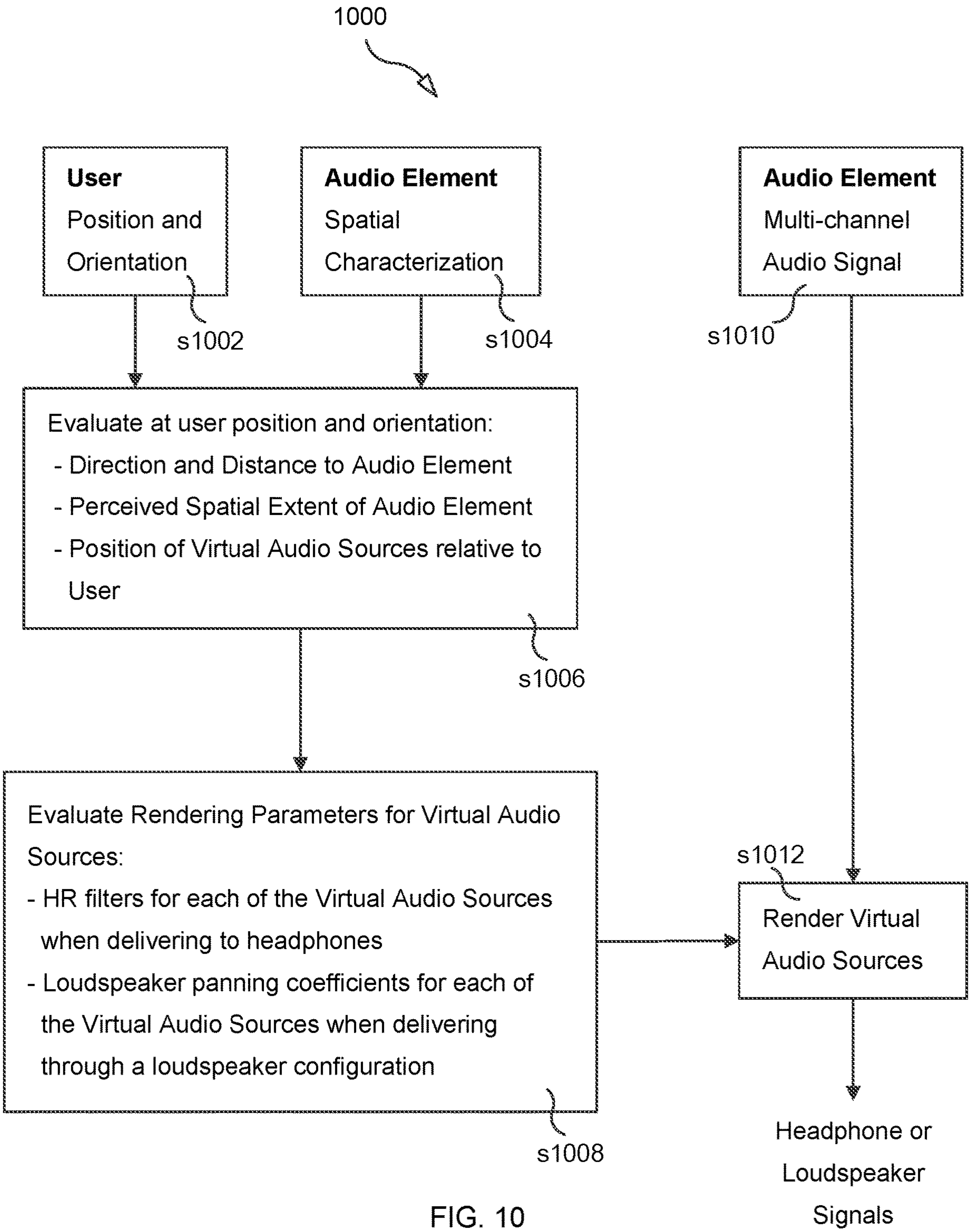
FIG. 10 illustrates an overview of the process of rendering a spatially-heterogeneous audio element.

FIG. 10 illustrates a process 1000 of rendering a spatially-heterogeneous audio element according to some embodiments. Step s1002 comprises obtaining the current position and/or the current orientation of a user. Step s1004 comprises obtaining information regarding spatial characterization of a spatially-heterogeneous audio element. Step s1006 comprises evaluating the following information at the current position and/or the current orientation of the user: direction and distance to the spatially-heterogeneous audio element; perceived spatial extent of the spatially-heterogeneous audio element; and/or position of virtual audio sources relative to the user. Step s1008 comprises evaluating rendering parameters for the virtual audio sources. The rendering parameters may comprise configuration information of HR filters for each of the virtual audio sources when delivering to headphones and loudspeaker panning coefficients for each of the virtual audio sources when delivering through a loudspeaker configuration. Step s1010 comprises obtaining a multi-channel audio signal. Step s1012 comprises rendering virtual audio sources based on the multi-channel audio signals and the rendering parameters, and outputting headphone or loudspeaker signals.

Figure 11:
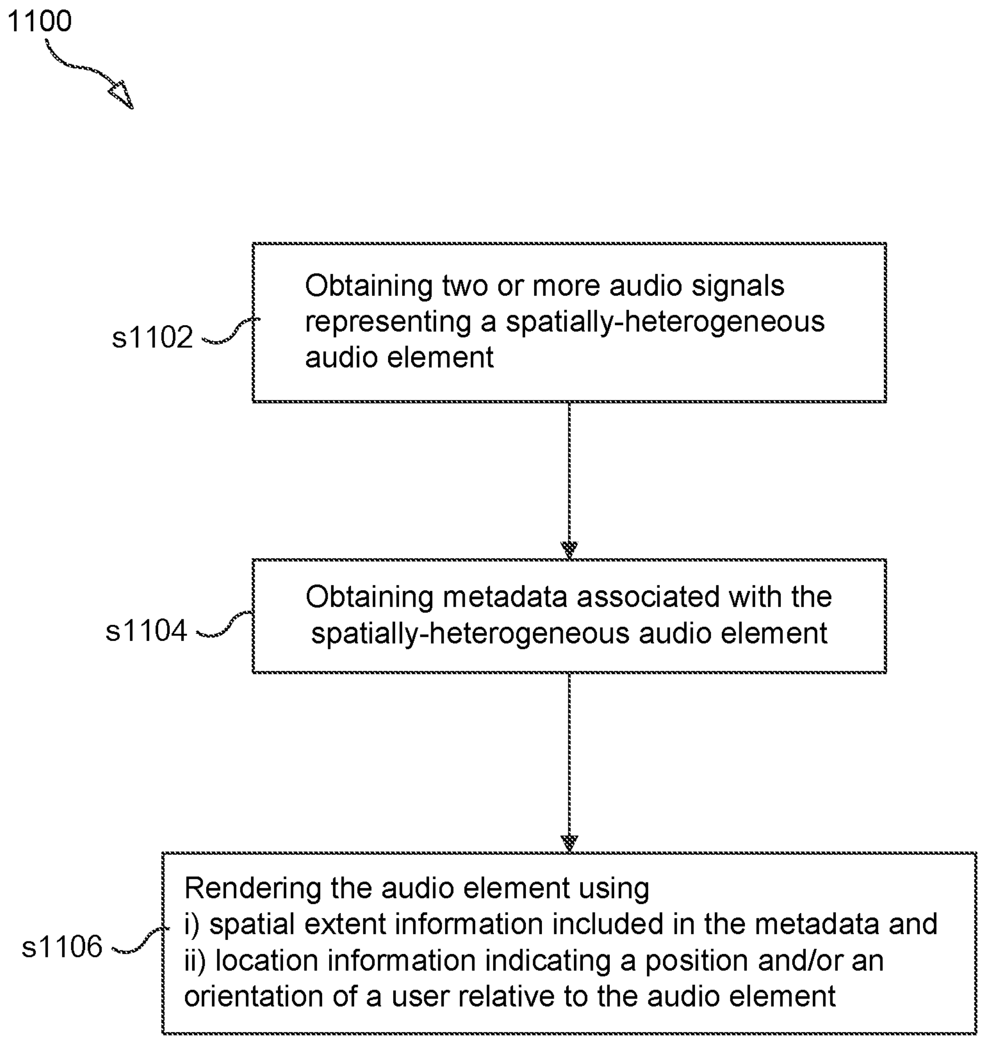
FIG. 11 is a flow chart illustrating a process according to some embodiments.

FIG. 11 is a flowchart illustrating a process 1100 according to an embodiment. Process 1100 may begin in step s1102.

Step s1102 comprises obtaining two or more audio signals representing a spatially-heterogeneous audio element, wherein a combination of the audio signals provides a spatial image of the spatially-heterogeneous audio element. Step s1104 comprises obtaining metadata associated with the spatially-heterogeneous audio element, the metadata comprising spatial extent information indicating a spatial extent of the spatially-heterogeneous audio element. Step s1106 comprises rendering the spatially-heterogeneous audio element using: i) the spatial extent information and ii)

location information indicating a position (e.g. virtual position) and/or an orientation of the user relative to the spatially-heterogeneous audio element.

In some embodiments, the spatial extent of the spatially-heterogeneous audio element corresponds to the size of the spatially-heterogeneous audio element in one or more dimensions perceived at a first virtual position or at a first virtual orientation with respect to the spatially-heterogeneous audio element.

In some embodiments, the spatial extent information specifies a physical size or a perceived size of the spatially-heterogeneous audio element.

In some embodiments, rendering the spatially-heterogeneous audio element comprises modifying at least one of the two or more audio signals based on the position of the user relative to the spatially-heterogeneous audio element (e.g., relative to the notional spatial center of the spatially-heterogeneous audio element) and/or the orientation of the user relative to an orientation vector of the spatially-heterogeneous audio element.

In some embodiments, the metadata further comprises: i) microphone setup information indicating a spacing between microphones (e.g., virtual microphones), orientations of the microphones with respect to a default axis, and/or type of the microphones, ii) first relationship information indicating a distance between the microphones and the spatially-heterogeneous audio element (e.g., distance between the microphones and the notional spatial center of the spatially-heterogeneous audio element) and/or orientations of the virtual microphones with respect to an axis of the spatially-heterogeneous audio element, and/or iii) second relationship information indicating a default position with respect to the spatially-heterogeneous audio element (e.g., w.r.t. the notional spatial center of the spatially-heterogeneous audio element) and/or a distance between the default position and the spatially-heterogeneous audio element.

In some embodiments, rendering the spatially-heterogeneous audio element comprises producing a modified audio signal, the two or more audio signals represent the spatially-heterogeneous audio element perceived at a first virtual position and/or a first virtual orientation with respect to the audio element, the modified audio signal is used to represent the spatially-heterogeneous audio element perceived at a second virtual position and/or a second virtual orientation with respect to the spatially-heterogeneous audio element, and the position of the user corresponds to the second virtual position and/or the orientation of the user corresponds to the second virtual orientation.

In some embodiments, the two or more audio signals comprise a left audio signal (L) and a right audio signal (R), rendering the audio element comprises producing a modified left signal (L') and a modified right signal (R'), [L' R']^T=H×[L R]^T where H is a transformation matrix, and the transformation matrix is determined based on the obtained metadata and the location information.

In some embodiments, the step of rendering the spatially-heterogeneous audio element comprises producing one or more modified audio signals and binaural rendering of the audio signals, including at least one of the modified audio signals.

In some embodiments, rendering the spatially-heterogeneous audio element comprises: generating a first output signal ($E_L$) and a second output signal ($E_R$), wherein $E_L$=L'*$HRTF_L$ where $HRTF_L$ is a Head-Related Transfer Function (or corresponding impulse response) for a left ear, and $E_R$=R'*$HRTF_R$ where $HRTF_R$ is a Head-Related Transfer Function (or corresponding impulse response) for a right ear. The generation of two output signals may be done in the time domain, with filtering operations (convolution) using the impulse responses, or any transform domain, such as the Discrete Fourier Transform (DFT) domain, by application of HRTFs.

In some embodiments, obtaining the two or more audio signals further comprises obtaining a plurality of audio signals, converting the plurality of audio signals to be in Ambisonics format, and generating the two or more audio signals based on the converted plurality of audio signals.

In some embodiments, the metadata associated with the spatially-heterogeneous audio element specifies: a notional spatial center of the spatially-heterogeneous audio element, and/or an orientation vector of the spatially-heterogeneous audio element.

In some embodiments, the step of rendering the spatially-heterogeneous audio element comprises producing one or more modified audio signals and rendering of the audio signals, including at least one of the modified audio signals onto physical loudspeakers.

In some embodiments, the audio signals, including at least one modified audio signal, are rendered as virtual speakers.

Figure 12:
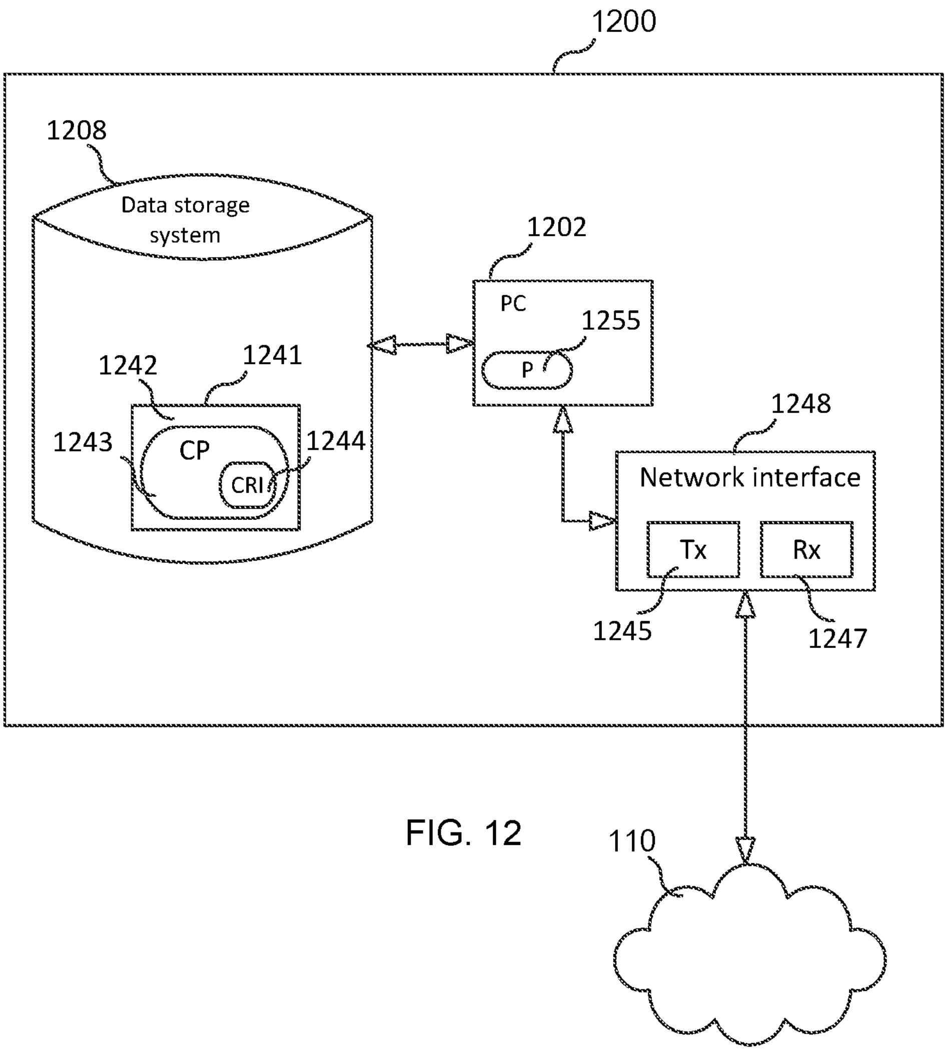
FIG. 12 is a block diagram of an apparatus according to some embodiments.

FIG. 12 is a block diagram of an apparatus 1200, according to some embodiments, for implementing system 400 shown in FIG. 4. As shown in FIG. 12, apparatus 1200 may comprise: processing circuitry (PC) 1202, which may include one or more processors (P) 1255 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed; a network interface 1248 comprising a transmitter (Tx) 1245 and a receiver (Rx) 1247 for enabling apparatus 1200 to transmit data to and receive data from other nodes connected to a network 110 (e.g., an Internet Protocol (IP) network) to which network interface 1248 is connected; and a local storage unit (a.k.a., "data storage system") 1208, which may include one or more non-volatile storage devices and/or one or more volatile storage devices. In embodiments where PC 1202 includes a programmable processor, a computer program product (CPP) 1241 may be provided. CPP 1241 includes a computer readable medium (CRM) 1242 storing a computer program (CP) 1243 comprising computer readable instructions (CRIs) 1244. CRM 1242 may be a non-transitory computer readable medium, such as, magnetic media (e.g., a hard disk), optical media, memory devices (e.g., random access memory, flash memory), and the like. In some embodiments, the CRI 1244 of computer program 1243 is configured such that when executed by PC 1202, the CRI causes apparatus 1200 to perform steps described herein (e.g., steps described herein with reference to the flow charts). In other embodiments, apparatus 1200 may be configured to perform steps described herein without the need for code. That is, for example, PC 1202 may consist merely of one or more ASICs. Hence, the features of the embodiments described herein may be implemented in hardware and/or software.

Summary of Embodiments

A1. A method for rendering a spatially-heterogeneous audio element for a user, the method comprising: obtaining two or more audio signals representing the spatially-heterogeneous audio element, wherein a combination of the audio signals provides a spatial image of the spatially-heterogeneous audio element; obtaining metadata associated with the spatially-heterogeneous audio element, the metadata comprising spatial extent information indicating a spatial extent of the spatially-heterogeneous audio element; modifying at least one of the audio signals using i) the spatial extent information and ii) location information indicating a position (e.g. virtual position) and/or an orientation of the user relative to the spatially-heterogeneous audio element, thereby producing at least one modified audio signal; and rendering the spatially-heterogeneous audio element using the modified audio signal(s).

A2. The method of embodiment A1, wherein the spatial extent of the spatially-heterogeneous audio element corresponds to the size of the spatially-heterogeneous audio element in one or more dimensions perceived at a first virtual position or at a first virtual orientation with respect to the spatially-heterogeneous audio element.

A3. The method of embodiment A1 or A2, wherein the spatial extent information specifies a physical size or a perceived size of the spatially-heterogeneous audio element.

A4. The method of embodiment A3, wherein modifying the at least one of the audio signals comprises modifying the at least one of the audio signals based on the position of the user relative to the spatially-heterogeneous audio element (e.g., relative to the notional spatial center of the spatially-heterogeneous audio element) and/or the orientation of the user relative to an orientation vector of the spatially-heterogeneous audio element.

A5. The method of any one of embodiments A1-A4, wherein the metadata further comprises: i) microphone setup information indicating a spacing between microphones (e.g., virtual microphones), orientations of the microphones with respect to a default axis, and/or type of the microphones, ii) first relationship information indicating a distance between the microphones and the spatially-heterogeneous audio element (e.g., distance between the microphones and the notional spatial center of the spatially-heterogeneous audio element) and/or orientations of the virtual microphones with respect to an axis of the spatially-heterogeneous audio element, and/or iii) second relationship information indicating a default position with respect to the spatially-heterogeneous audio element (e.g., w.r.t. the notional spatial center of the spatially-heterogeneous audio element) and/or a distance between the default position and the spatially-heterogeneous audio element.

A6. The method of any one of embodiments A1-A5, wherein the two or more audio signals represent the spatially-heterogeneous audio element perceived at a first virtual position and/or a first virtual orientation with respect to the spatially-heterogeneous audio element, the modified audio signal is used to represent the spatially-heterogeneous audio element perceived at a second virtual position and/or a second virtual orientation with respect to the audio element, and the position of the user corresponds to the second virtual position and/or the orientation of the user corresponds to the second virtual orientation.

A7. The method of any one of embodiments A1-A6, wherein the two or more audio signals comprise a left audio signal (L) and a right audio signal (R), the modified audio signals comprises a modified left signal (L') and a modified right signal (R'), $[L'\ R']^T = H \times [L\ R]^T$ where H is a transformation matrix, and the transformation matrix is determined based on the obtained metadata and the location information.

A8. The method of embodiment A7, wherein rendering the spatially-heterogeneous audio element comprises: generating a first output signal ($E_L$) and a second output signal ($E_R$), wherein $E_L = L' * HRTF_L$ where $HRTF_L$ is a Head-Related Transfer Function (or corresponding impulse response) for a left ear, and $E_R = R' * HRTF_R$ where $HRTF_R$ is a Head-Related Transfer Function (or corresponding impulse response) for a right ear.

A9. The method of any one of embodiments A1-A8, wherein obtaining the two or more audio signals further comprises: obtaining a plurality of audio signals; converting the plurality of audio signals to be in Ambisonics format; and generating the two or more audio signals based on the converted plurality of audio signals.

A10. The method of any one of embodiments A1-A9, wherein the metadata associated with the spatially-heterogeneous audio element specifies: a notional spatial center of the audio element, and/or an orientation vector of the spatially-heterogeneous audio element.

A11. The method of any one of embodiments A1-A10, wherein the step of rendering the spatially-heterogeneous audio element comprises binaural rendering of the audio signals, including the at least one modified audio signal.

A12. The method of any one of embodiments A1-A10, wherein the step of rendering the spatially-heterogeneous audio element comprises rendering of the audio signals, including at least one modified audio signal onto physical loudspeakers.

A13. The method of embodiments A11 or A12, wherein the audio signals, including at least one modified audio signal, are rendered as virtual speakers.

While various embodiments of the present disclosure are described herein (including the appendices, if any), it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for rendering a spatially-heterogeneous audio element having a source signal comprising a first audio channel and a second audio channel, the method comprising:

obtaining the spatially-heterogeneous audio element's source signal;

obtaining extent information indicating an extent of the spatially-heterogeneous audio element;

obtaining audio element position information indicating a position of the spatially-heterogeneous audio element;

obtaining listening position information indicating a listening position; and rendering the spatially-heterogeneous audio element using: i) the source signal, ii) the extent information, iii) the audio element position information indicating the position of the spatially-heterogeneous audio element, and iv) the listening position information indicating the listening position.

2. The method of claim 1, wherein the step of rendering the spatially-heterogeneous audio element comprises:

producing an output audio signal from the source signal; and rendering of the output audio signal onto physical loudspeakers.

3. The method of claim 1, wherein obtaining the extent information comprises obtaining metadata associated with the spatially-heterogeneous audio element where the metadata comprises the extent information, and rendering the spatially-heterogeneous audio element using the extent information comprises obtaining modified extent information based on the extent information included in the metadata and rendering the spatially-heterogeneous audio element using the modified extent information.

4. The method of claim 1, wherein rendering the spatially-heterogeneous audio element comprises generating a first virtual loudspeaker signal using the first channel of the source signal and generating a second virtual loudspeaker signal using the second channel of the source signal.

5. The method of claim 1, wherein rendering the spatially-heterogeneous audio element comprises deriving two or more audio signals from the source signal.

6. The method of claim 1, wherein the first channel is a left audio signal (L)

the second channel is a right audio signal (R), and rendering the spatially-heterogeneous audio element comprises producing a modified left signal (L') and a modified right signal (R').

7. The method of claim 6, wherein

[L' R']^T=H×[L R]^T where H is a transformation matrix, and the transformation matrix is determined based on the obtained metadata and the listening position information.

8. The method of claim 1, wherein rendering the spatially-heterogeneous audio element comprises adding a decorrelated signal to the first and/or second channel of the source signal.

9. The method of claim 1, wherein rendering the spatially-heterogeneous audio element comprises binaural rendering of one or more signals produced using the source signal.

10. A non-transitory computer readable medium storing a computer program comprising instructions for configuring an apparatus comprising processing circuitry operable to execute the instructions to perform the method of claim 1.

11. An apparatus for rendering a spatially-heterogeneous audio element having a source signal comprising a first audio channel and a second audio channel, the apparatus comprising:

a computer readable storage medium; and processing circuitry coupled to the computer readable storage medium, wherein the apparatus is configured to perform a method comprising:

obtaining the spatially-heterogeneous audio element's source signal;

obtaining extent information indicating an extent of the spatially-heterogeneous audio element;

obtaining audio element position information indicating a position of the spatially-heterogeneous audio element;

obtaining listening position information indicating a listening position; and rendering the spatially-heterogeneous audio element using: i) the source signal, ii) the extent information, iii) the audio element position information indicating the position of the spatially-heterogeneous audio element, and iv) the listening position information indicating the listening position.

12. The apparatus of claim 11, wherein the step of rendering the spatially-heterogeneous audio element comprises:

producing an output audio signal from the source signal; and rendering of the output audio signal onto physical loudspeakers.

13. The apparatus of claim 11, wherein obtaining the extent information comprises obtaining metadata associated with the spatially-heterogeneous audio element where the metadata comprises the extent information, and rendering the spatially-heterogeneous audio element using the extent information comprises obtaining modified extent information based on the extent information included in the metadata and rendering the spatially-heterogeneous audio element using the modified extent information.

14. The apparatus of claim 11, wherein rendering the spatially-heterogeneous audio element comprises generating a first virtual loudspeaker signal using the first channel of the source signal and generating a second virtual loudspeaker signal using the second channel of the source signal.

15. The apparatus of claim 11, wherein rendering the spatially-heterogeneous audio element comprises deriving two or more audio signals from the source signal.

16. The apparatus of claim 11, wherein the first channel is a left audio signal (L)

the second channel is a right audio signal (R), and rendering the spatially-heterogeneous audio element comprises producing a modified left signal (L') and a modified right signal (R').

17. The apparatus of claim 16, wherein

[L' R']^T=H×[L R]^T where H is a transformation matrix, and the transformation matrix is determined based on the obtained metadata and the listening position information.

18. The apparatus of claim 11, wherein rendering the spatially-heterogeneous audio element comprises adding a decorrelated signal to the first and/or second channel of the source signal.

19. The apparatus of claim 11, wherein rendering the spatially-heterogeneous audio element comprises binaural rendering of one or more signals produced using the source signal.

* * * * *